(12) United States Patent
Srinivasulu et al.

(10) Patent No.: US 11,294,876 B2
(45) Date of Patent: Apr. 5, 2022

(54) SYSTEM AND METHOD FOR GENERATING A MULTI DIMENSIONAL DATA CUBE FOR ANALYTICS USING A MAP-REDUCE PROGRAM

(71) Applicant: Oracle International Corporation, Redwood Shores, CA (US)

(72) Inventors: Midda Dharmika Srinivasulu, Bangalore (IN); Ambuj Saxena, Bangalore (IN); Amrita Patil, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 142 days.

(21) Appl. No.: 15/611,030

(22) Filed: Jun. 1, 2017

(65) Prior Publication Data

US 2018/0349423 A1 Dec. 6, 2018

(51) Int. Cl.
  *G06F 16/22* (2019.01)
  *G06F 12/0875* (2016.01)
  *G06F 16/13* (2019.01)
  *G06F 16/14* (2019.01)
  *G06F 16/172* (2019.01)
  (Continued)

(52) U.S. Cl.
  CPC ...... *G06F 16/2264* (2019.01); *G06F 12/0875* (2013.01); *G06F 16/13* (2019.01); *G06F 16/148* (2019.01); *G06F 16/172* (2019.01);

*G06F 16/182* (2019.01); *G06F 16/283* (2019.01); *G06F 2212/601* (2013.01)

(58) Field of Classification Search
  CPC .. G06F 16/2264; G06F 16/283; G06F 16/182; G06F 16/172; G06F 16/148; G06F 16/13; G06F 12/0875; G06F 2212/60
  See application file for complete search history.

(56) References Cited

U.S. PATENT DOCUMENTS

| 2007/0250524 A1* | 10/2007 | Le ............... G06F 16/2433 |
| 2012/0130940 A1* | 5/2012 | Gattani ............ G06F 16/958 707/600 |

(Continued)

OTHER PUBLICATIONS

Jason Edwards, "Storing Planning Data in IBM Cognos: D-Cube (Part 1)", Jul. 2009, 13 pages.

*Primary Examiner* — Aleksandr Kerzhner
*Assistant Examiner* — Aryan D Toughiry
(74) *Attorney, Agent, or Firm* — Tucker Ellis LLP

(57) ABSTRACT

In accordance with an embodiment, described herein is a system and method for generating a data cube for analytics. A map-reduce program running in a data processing cluster can read each line of a source data, and generate a key-value pair for each of a plurality of data combinations in that line of data. Values paired with the same key can be aggregated to generate one or more frequency values or one or more aggregate values, for representing the result of a query on the source data. Each query result can be stored in an output file, and can be encapsulated into a data cube cached in a distributed file system of the data processing cluster. The data cube can map a query from a client application to an output file, and can return a pre-computed result in the output file from the data cube to the client application.

18 Claims, 5 Drawing Sheets

(51) Int. Cl.
   *G06F 16/182* (2019.01)
   *G06F 16/28* (2019.01)

(56) References Cited

U.S. PATENT DOCUMENTS

| | | | |
|---|---|---|---|
| 2015/0106325 A1* | 4/2015 | Cole | G06F 16/24556 707/600 |
| 2015/0193719 A1* | 7/2015 | Than | G06Q 10/105 705/7.39 |
| 2015/0310082 A1* | 10/2015 | Han | G06F 16/283 707/602 |
| 2016/0011980 A1* | 1/2016 | Koike | G06F 12/0875 711/126 |
| 2016/0048572 A1* | 2/2016 | Khandelwal | G06F 16/283 707/604 |
| 2017/0109387 A1* | 4/2017 | Brewster | G06F 16/23 |
| 2018/0203931 A1* | 7/2018 | Abson | G06F 16/248 |

* cited by examiner

SYSTEM AND METHOD FOR GENERATING A MULTI DIMENSIONAL DATA CUBE FOR ANALYTICS USING A MAP-REDUCE PROGRAM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to data analytics, and are particularly related to a system and method for generating a data cube for analytics using a map-reduce program in a data processing cluster.

BACKGROUND

Analytics, as a way of examining raw data with the purpose of drawing conclusions, often requires execution of queries on a data cube that is created to overcome the limitations of relational databases. A data cube can display and sum large amounts of data, and can provide users with searchable access to any data points.

However, query execution on a data cube can be time consuming, since the data cube may need to be rebuilt for each query. Existing solutions include pre-computing all or portions of the cells in a data cube.

Although such solutions can enable fast response time for queries, the pre-computed data cube requires a lot of memory. Further, complex queries for data from multiple cells may still be slow, since results for the complex queries need to be computed on the fly or dynamically.

SUMMARY

In accordance with an embodiment, described herein is a system and method for generating a data cube for analytics. A map-reduce program running in a data processing cluster can read each line of a source data, and generate a key-value pair for each of a plurality of data combinations in that line of data. Values paired with the same key can be aggregated to generate one or more frequency values or one or more aggregate values, for representing the result of a query on the source data. Each query result can be stored in an output file, and can be encapsulated into a data cube cached in a distributed file system of the data processing cluster. The data cube can map a query from a client application to an output file, and can return a pre-computed result in the output file from the data cube to the client application.

DETAILED DESCRIPTION

Figure 1:
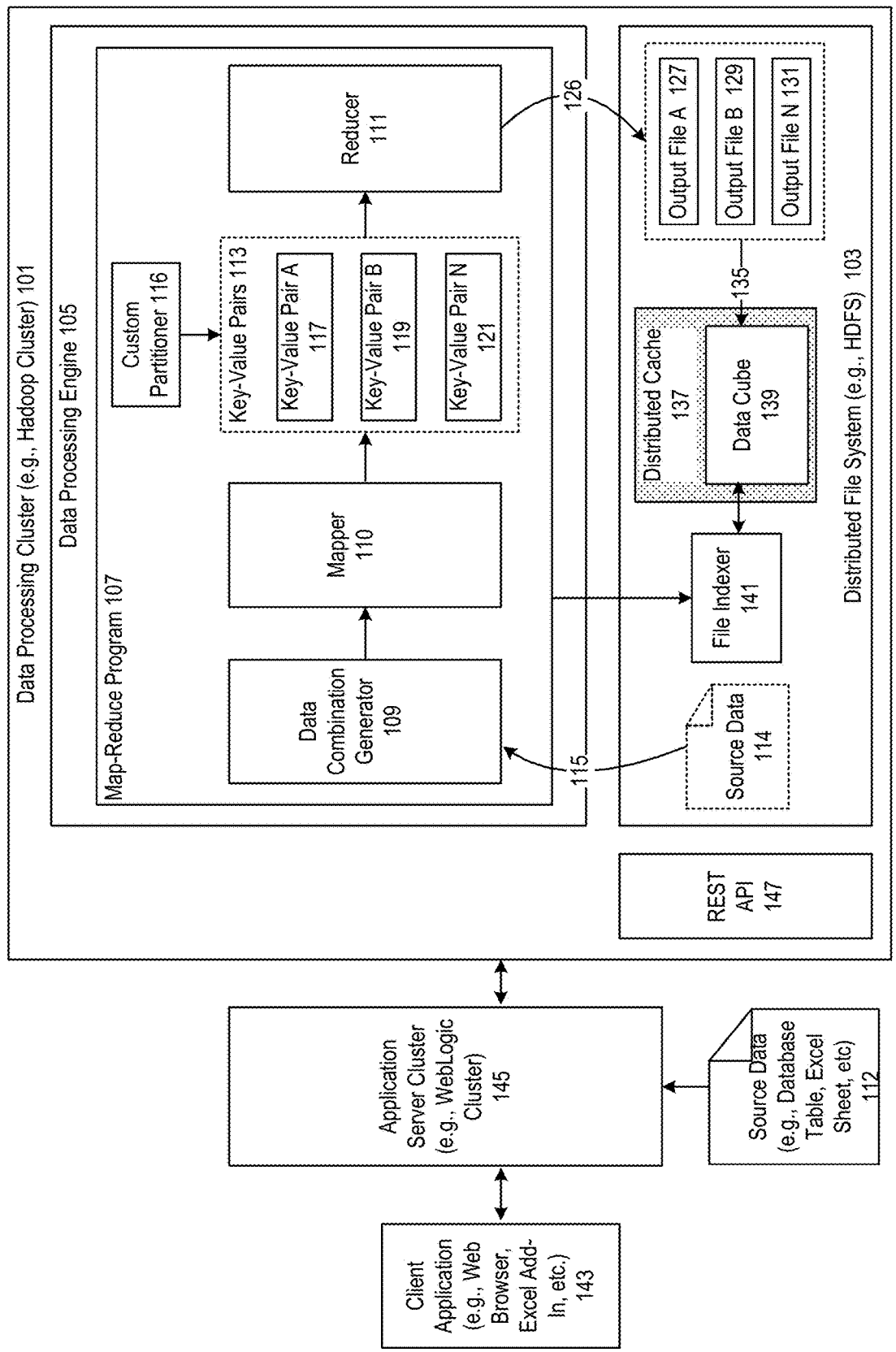
FIG. 1 illustrates a system for generating a multidimensional data for analytics using a map-reduce program in a data processing cluster, in accordance with an embodiment.

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

In accordance with an embodiment, described herein is a system and method for generating a data cube for analytics. A map-reduce program running in a data processing cluster can read each line of a source data, and generate a key-value pair for each of a plurality of data combinations in that line of data. Values paired with the same key can be aggregated to generate one or more frequency values or one or more aggregate values, for representing the result of a query on the source data. Each query result can be stored in an output file, and can be encapsulated into a data cube cached in a distributed file system of the data processing cluster. The data cube can map a query from a client application to an output file, and can return a pre-computed result in the output file from the data cube to the client application.

In accordance with an embodiment, the data cube can be associated with a file indexer that includes a plurality of mapping strings. Each mapping string can map a query from the client application to a corresponding output file in the data cube.

In accordance with an embodiment, the system can profile the source data, find features and dimensions and attributes of the source data. The plurality of queries on the source data can be determined by the dimension columns and attribute columns of the source data. The results of the plurality of queries can be cached in a distributed cache system over the distributed file system, for adhoc queries from the client application and data visualization displayed in the client application.

Accordingly, by returning pre-computed results for queries on the source data, and by caching the pre-computed results in distributed caches of a highly scalable data processing cluster, the system can ensure fast response time for complex queries on the source data, and can overcome the large memory requirement often associated with pre-computed data cube.

FIG. 1 illustrates a system for generating a multidimensional data for analytics using a map-reduce program in a data processing cluster, in accordance with an embodiment.

As shown in FIG. 1, the system can include a data process cluster 101 that implements a data processing infrastructure. The data processing infrastructure can include a distributed file system 103 to provide fault-tolerant storage while scaling horizontally; and a map-reduce processing framework that can break processing jobs into tasks and distribute the tasks across the data processing cluster, or a massively parallel environment.

The data processing infrastructure allows developers to deploy custom-written map-reduce programs coded in Java or another language to process data in a parallel fashion across hundreds or thousands of commodity servers. Such a map-reduce program can include a mapper that processes input data, and a reducer that assembles intermediate results into one or more final results.

In accordance with an embodiment, the data processing cluster can be a highly scalable Hadoop cluster, and can be used to boost the speed of data analytics applications. For example, when the data processing cluster's processing power is overwhelmed by growing volumes of data, additional cluster nodes can be added to increase throughput. The data processing cluster can also be highly resistant to failure since each piece of data is copied onto other cluster nodes, which ensures that the data is not lost if one node fails.

As shown in FIG. 1, the data processing cluster can include a data processing engine 105 with a map-reduce program 107 that includes a data processing algorithm implemented by a data combination generator 109, a mapper 110, a reducer 111, and a custom partitioner 116. The map-reduce program 107 is a custom-written map-reduce program that relies on the map-reduce processing framework described above.

In accordance with an embodiment, the data process engine can receive a source data 112 through an application cluster 145. The source data can be a structured data in a plurality of formats, including a flat tab separated file, an Excel sheet, a database table, and a JavaScript Notation (JSON) document for hierarchical data.

In accordance with an embodiment, the source data can be converted into a file type expected by the data processing engine. After converting the source data into the expected file type, the data processing engine can store the converted source data 114 in the distributed file system.

In accordance with an embodiment, the source data 114 can be provided 115 to the data combination generator, which can determine data types of the columns in the source data, and generate a plurality of column combinations of the columns.

In accordance with an embodiment, the plurality of column combinations can be used to generate data combinations for each line of the source data. The data combinations generated for the source data can be provided to the mapper, which can generate a plurality of key-value pairs 113, for example, key-value pair A 117, key-value pair B 119, and key-value pair N 121, from the plurality of data combinations.

For example, if the source data includes Column A, Column B and Column C, and the data in the three columns for the first row/line of data after the header row is a, b, and c respectively, the data combinations for the first row of data would be a, b, c, a:b, a:c, and b:c. The colon in the above data combinations can be a delimiter between the two values in each data combination. Data combinations for each of the other rows in the source data can be similarly generated.

In accordance with an embodiment, the key in each key-value pair can include one or more string literals and a suffix. The string literals can represent the indexes of source data columns containing the value in the key-value pair.

For example, in the above example source data that includes Columns A, B and C, the key for the data combination "a" can be "0_F", and the key for the data combination "a:b" can be "0_F:1_F".

In accordance with an embodiment, the mapper can aggregate values paired with the same key to find frequency values or aggregate values. The aggregate values include the maximum value, the minimum value, the average value, the median, and the mode of the values paired with the same key.

In accordance with an embodiment, the customer partitioner can be used to determine the number of mapping tasks for use in aggregating the key-value pairs.

In accordance with an embodiment, the mapper can further generate a plurality of output files, each storing one of the frequency values or aggregate values.

As shown in FIG. 1, output file A 127, output file B 129 and output file N 131 can be generated 126 in the distributed file system by the mapper. The plurality of output files can be encapsulated 135 into a data cube 139 in a distributed cache 137 on the distributed file system. The data cube can expose the pre-computed query results, and can act as a central point of queries for all client applications.

In accordance with an embodiment, the map-reduce program can also include a file indexer 141, which can be used to map a query from a client application 143 to a corresponding output file encapsulated in the data cube. The data cube can return a pre-computed result to the client application in response to the query.

In accordance with an embodiment, the client application can be a web browser or an Excel sheet or another type of application that serves as a graphical user interface (GUI) tool. The GUI tool can use the pre-computer query results in the data cube to generate rich multi-dimensional graphs, and allow the user to perform data analysis and visual recommendations.

As further shown by FIG. 1, a representational state transfer (REST) application programming interface (API) 147 can be exposed by the data processing cluster, for use by the client application to run queries over the data cube. The REST API can also be used by the client application to invoke the map-reduce program and to cancel a running instance of the map-reduce program.

In accordance with an embodiment, an application server in the application cluster can start and monitor an instance of the map-reduce program by passing an engine context. The map-reduce program can read request information from the engine context, identify input and output information from the request information, and use the input and output information (e.g., input path and output path) to read the source data stored in the distributed file system and write the output files back to the distributed file system.

In an accordance with an embodiment, processing information for the source data (e.g., output, input, and status information) can be communicated back to the application sever using the engine context.

Figure 2:
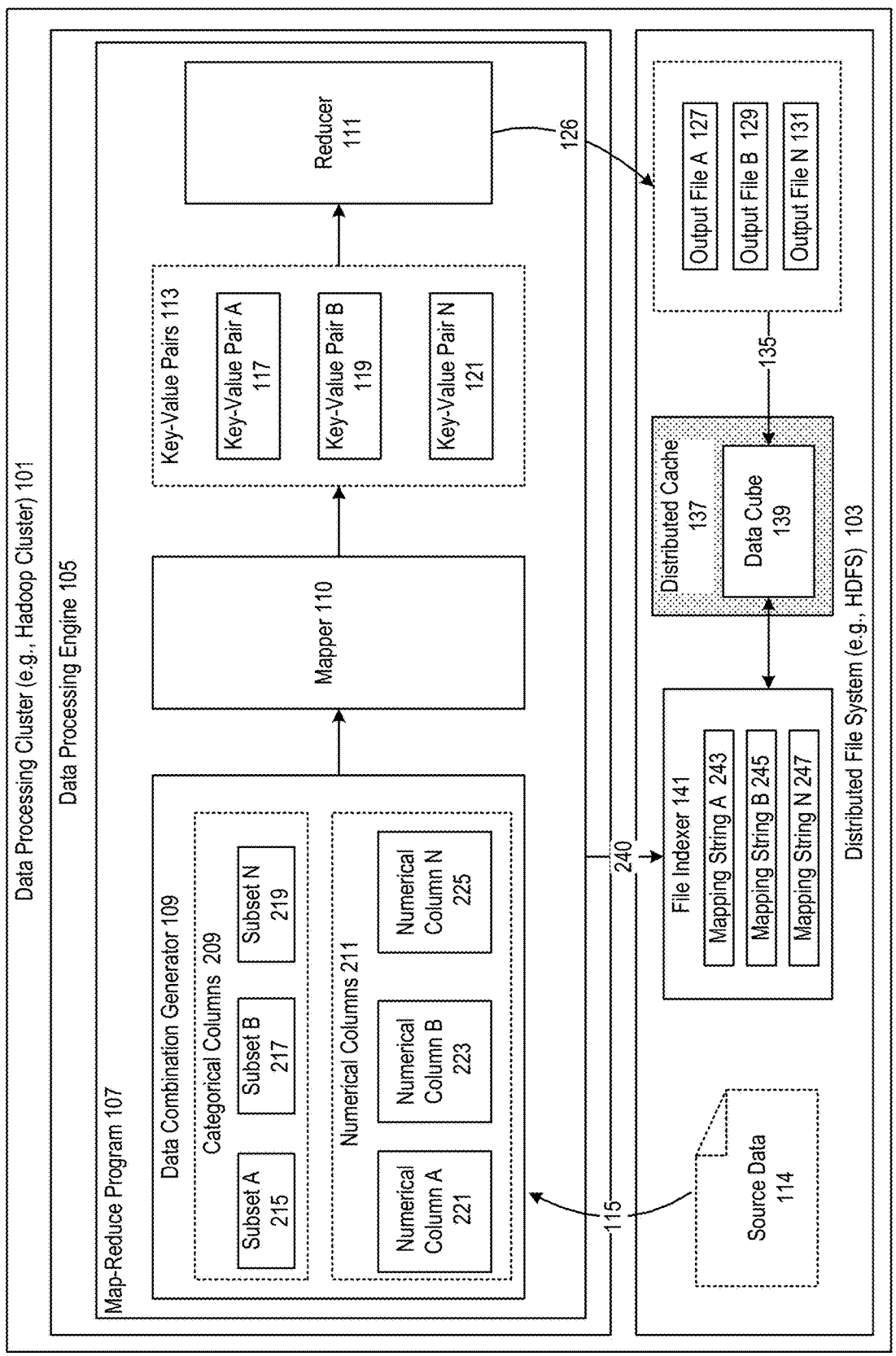
FIG. 2 further illustrates a system for generating a multidimensional data for analytics using a map-reduce program, in accordance with an embodiment.

FIG. 2 further illustrates a system for generating a multidimensional data for analytics using a map-reduce program, in accordance with an embodiment.

As shown in FIG. 2, the data combination generator can clean the source data by removing one or more columns that are not to be considered when generating column combinations for use in generating data combinations.

For example, a column that contains a unique value in each row or a single value in all the rows can be removed, and a column that has a variance of data that is not numeric can be removed; whereas numerical columns and columns including categorical values can be considered for the purpose of generating column combinations.

In accordance with an embodiment, the data combination generator can analyze the cleaned source data after the header row, and identify a plurality of numerical columns 211; and a plurality of subsets of the categorical columns 209 in the source data, for example, subset A 215, subset B 217 and subset N 219.

In accordance with an embodiment, a categorical column can be a String column or a Boolean column, and a numerical column can be a column with a data type of byte, char, short, int, long, float and double. The data types associated with a numerical column can be exemplified by the corresponding primitive data types in the Java programming language.

In accordance with an embodiment, each subset of the categorical columns can be combined with each numerical column (for example, numerical column A 221, numerical column B 223, or numerical column N 225), to generate a plurality of additional column combinations.

In accordance with an embodiment, each subset of the categorical columns, and each combination of a categorical column subset and a numerical column can be used to generate a data combination for each line/row of the source data.

As an illustrative example, if a source data after being cleaned includes 5 rows; and 5 columns, in which Columns A, B, and C are categorical columns and Column D is a numerical column, the column combinations for the source data would be A, B, C, AB, AC, BC, ABC, AD, BD, CD, ABD, ACD, BCD, and ABCD. The empty subset (i.e. the subset that does not contain an element) can be ignored.

For each row of the source data, a data combination can be generated for each of the above column combination.

Accordingly, there can be a total of 60 data combinations (14 in each row multiplied by 5 rows) generated from the source data.

In accordance with an embodiment, for each data combination, the mapper can generate a key-value pair, where the key can comprise one or more string literals (e.g., "0", "1", and "01") and a suffix (e.g., "_F" or "_S).

In accordance with an embodiment, the reducer can aggregate values for the same key. If the values for the key include numerical values, the reducer can generate aggregate values for the key; otherwise, a frequency value can be generated for the key.

In accordance with an embodiment, the frequency values or aggregate values can represent results of queries on the source data, and can be stored in the plurality of output files. Accordingly, the number of output file created by the reducer can be the same as the number of queries on the source data.

In accordance with an embodiment, the map-reduce program can generate 240 a mapping string for each output file, for example, mapping string A 243, mapping string B 245 and mapping string N 247. The mapping strings can be used to map queries from the client applications to the corresponding output files.

Figure 3:
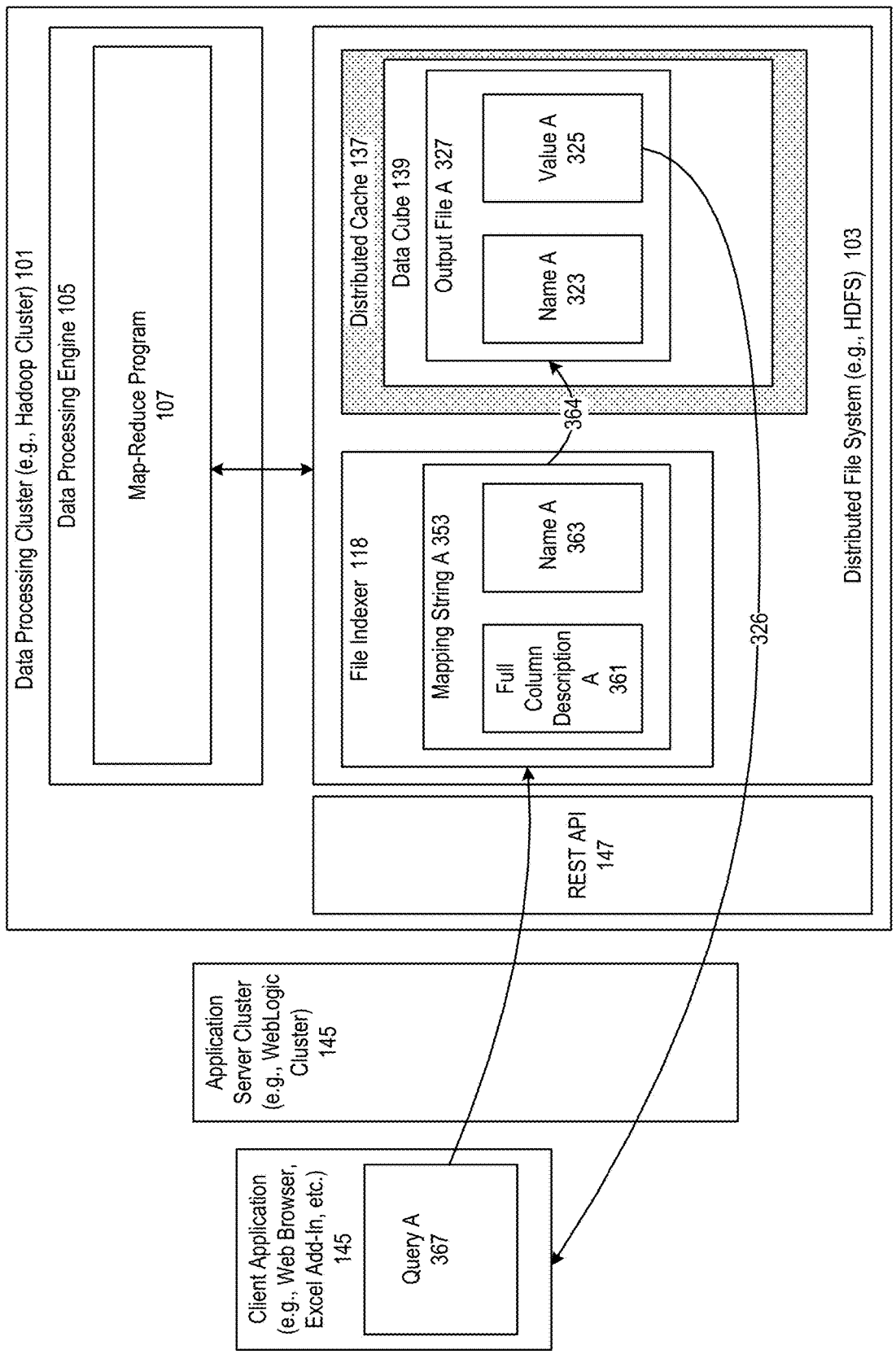
FIG. 3 further illustrates a system for generating a multidimensional data for analytics using a map-reduce program, in accordance with an embodiment.

FIG. 3 further illustrates a system for generating a multidimensional data for analytics using a map-reduce program, in accordance with an embodiment.

As shown in FIG. 3, the mapping string A in the file indexer can include full column description A 361 and name A 363.

In accordance with an embodiment, name A 363 is the same as the name (i.e., name A 323) of the associated output file. Full column description A can include information about columns and types of data (e.g., frequency and/or aggregate values) in the associated output file.

In accordance with an embodiment, mapping string A can further includes an output path that describes the location of the associated output file.

For example, the output path can describe where the associated output file (i.e. output file A 327) is located in the distributed file system.

In accordance with an embodiment, when query A 367 that specifies the type of data (e.g., frequency data from a particular column) is received by the file indexer from the client application, the file indexer can locate mapping string A based on the information in the query, and can use mapping string A to find output file A in the data cube. The data cube can return 326 value A 325 in output file A to the client application.

Figure 4:
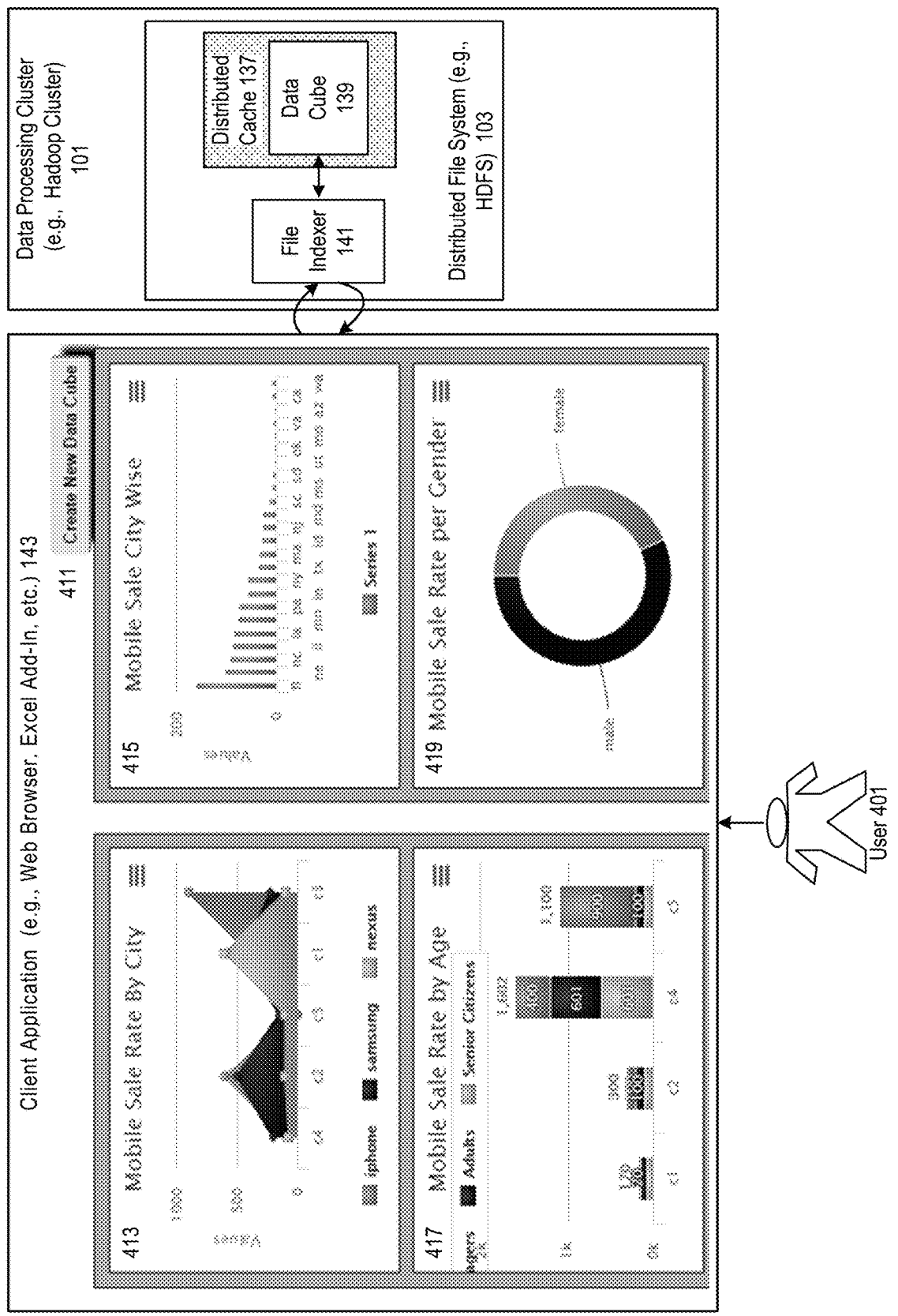
FIG. 4 further illustrates a system for generating a multidimensional data for analytics using a map-reduce program, in accordance with an embodiment.

FIG. 4 further illustrates a system for generating a multidimensional data for analytics using a map-reduce program, in accordance with an embodiment.

As shown in FIG. 4, the client application can be a web browser or an Excel Add-In, and can connect to the data cube cached in the HDFS.

In accordance with an embodiment, a REST API can be used to run queries over the data cube to retrieve data to generate rich multi-dimensional graphs 413, 415, 417 and 419. The client application can be used to analyze and design custom dashboards in an intuitive way, conduct intelligent data analysis and visual recommendations.

Because results of all possible queries have been pre-computed and cached in the data cube, response times to queries can be very fast, leading to fast displaying of the multi-dimensional graphs and other types of graphs or reports.

As further shown in FIG. 4, the client application can include a button "create new data cube" 411, which the user can use to trigger the creation of a new data cube from a source data using the map-reduce program described above.

Figure 5:
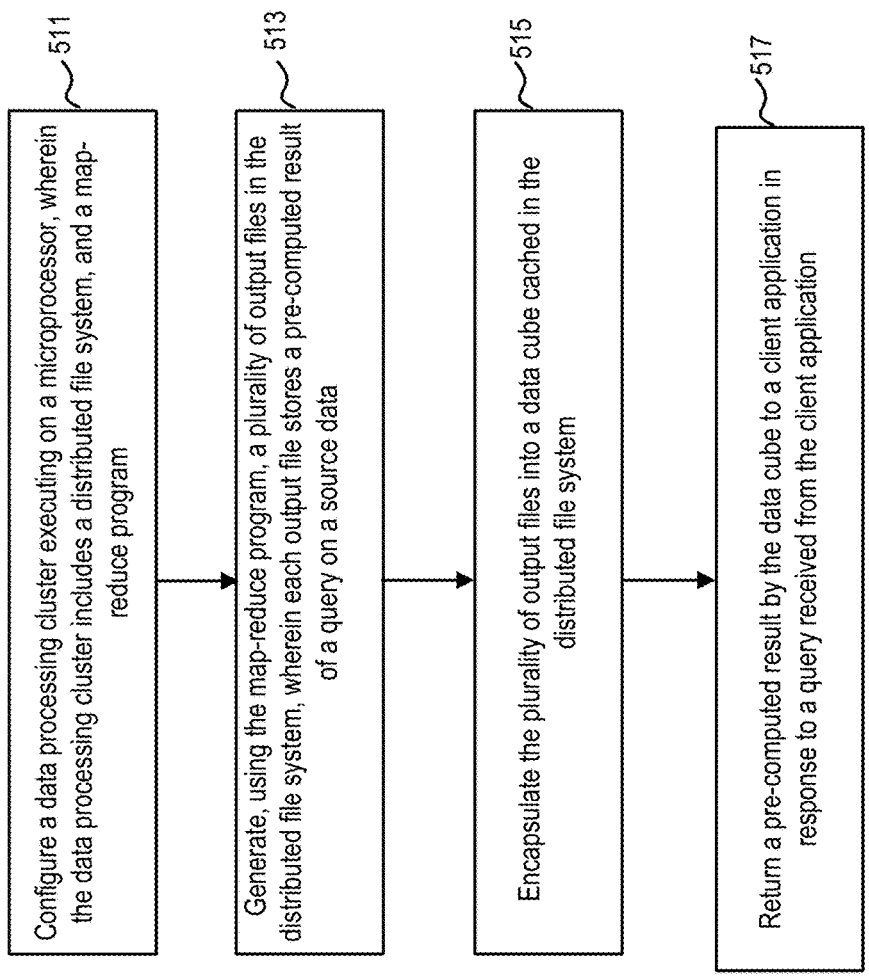
FIG. 5 illustrates a method for generating a multidimensional data for analytics using a map-reduce program, in accordance with an embodiment.

FIG. 5 illustrates a method for generating a multidimensional data for analytics using a map-reduce program, in accordance with an embodiment.

As shown in FIG. 5, at step 511, a data processing cluster executing on a microprocessor is configured, wherein the data processing cluster includes a distributed file system, and a map-reduce program.

At step 513, the map-reduce program generates a plurality of output files in the distributed file system, wherein each output file stores a pre-computed result of a query on a source data.

At step 515, the plurality of output files are encapsulated into a data cube cached in the distributed file system.

At step 517, the data cube returns a pre-computed result to a client an application in response to a query received from the client application.

Exemplary Implementation

In accordance with an embodiment, an illustration of an exemplary implementation of the system can be described as follows. The sample code snippets provided below are only for the purpose of illustration.

In accordance with an embodiment, Listing 1 illustrates an example data combination generator.

Listing 1

```
String sampleData = br.readLine( );
String[ ] columns = sampleData.split("\t");
//if (GenData.global_groupString == null) {
boolean group[ ] = new boolean[columns.length];
for (int i = 0; i < columns.length; i++) {
    if (columns[i].matches("-?\\d+(\\.\\d+)?")) {
        group[i] = false;
    } else {
        group[i] = true;
    }
}
String groupString = "";
String objString = "";
// Groupby string
for (int i = 0; i < columns.length; i++) {
    if (group[i]) {
        groupString += i;
    } else {
        objString += i;
    }
}
Map<String, String> queryMap = new HashMap<String, String>( );
Combinations comb = new Combinations( );
List<String> combs = comb.getCombi(groupString);
Collections.sort( combs);
```

As shown in Listing 1, a plurality of categorical columns and a plurality of numerical columns are identified. The "groupString" in Listing 1 is a group of indexes for the group of categorical columns, and the "objString" is a group of indexes for the group of numerical columns. The List "combs" can include all the subsets of the "groupString".

In accordance with an embodiment, Listing 2 below illustrates an example mapper.

Listing 2

```
public void gen(String line, Context context) throws IOException,
        Interrupted Exception {
    if (line.indexOf("$$$HEADER_ROW$$$") > 0) {
        // This is header row , do not do anything with this ROW, Just let
        // it pass
        return;
    }
    String[ ] columns = line.split("\t");
    // For each of the combinations, generate Key , value
    int combcount = 0;
    for (String c : combs) {
        String key = "";
        String value = "";
        for (int i = 0; i < c.length( ); i++) {
            key += c.charAt(i) + "_F:";
            int index = Integer.parseInt(c.charAt(i) + "");
            value += columns[index] + ":";
        }
        int parttion_number = combcount;
        if (context != null)
            context.write(new Text(parttion_number + "#" +
                key + "$" + value), new LongWritable(1));
        for (int i = 0; i < objString.length( ); i++) {
            String key1 = "";
            parttion_number = ((combs.size( ) - 1) * (i + 1)) +
                combcount; key1 = key + objString.charAt(i) + "_S:";
            int index = Integer.parseInt(objString.charAt(i) + "");
            long vl = 0L;
            try {
                vl = Long.parseLong(columns[index]);
            } catch (Exception e) {
            }
            if (context != null)
                context.write(new Text(parttion_number + "#" +
                    key1 + "$" + value), new LongWritable(vl));
        }
        combcount = combcount + 1;
    }
}
```

As shown in Listing 2, for each subset of the group of categorical columns, and for each combination of a subset and a numerical column can be used to generate a data combination for each row/line of data. For each data combination, a key-value is generated.

In accordance with an embodiment, Listing 3 below illustrates an example reducer.

Listing 3

```
@SuppressWarnings("unchecked")
protected void setup(Context context) throws IOException, InterruptedException {
    // Only read the keys once for the JVM instance
    if (column_names == null) {
        try {
            ObjectInputStream is =
                new ObjectInputStream(new FileInputStream("column_names"));
            List<String>keys = (List <String>) is.readObject( );
            column_names = (String[ ]) keys.toArray( );
        }
        catch (ClassNotFoundException e) {
```

Listing 3

```
                throw new RuntimeException(e); // bizarre!
            }
        }
    }
    @Override
    protected void reduce(Text key, Iterable<LongWritable> values,
                    Context context) throws IOException, InterruptedException {
            String totalKey = key.toString( );
            String actualKey = totalKey.split("#")[1];
            boolean findAll = false;
            Long freq = 0L;
            Long Avg = 0L;
            Long Max = 0L;
            Long Min = 0L;
            int count = 0;
            System.out.println(actualKey);
            String[ ] combivalue = actualKey.toString( ).split("\\$");
            if(combivalue.length>1){
                    String indexValues[ ] = combivalue[0].split(":");
                    String element= indexValues[indexValues.length-1];
                    String[ ] keyword = element.split("_");
                    if(keyword[1].equals("S")){
                        findAll =true;
                    }
            }
            if (combivalue.length > 1) {
                    String columnValues[ ] = combivalue[1].split(":");
                    String data = new String( );
                    data = columnValues[0];
                    for(int i=1; i<columnValues.length; i++) {
                        data += "\t"+columnValues[i];
                    }
                    data = data.trim( );
                    for (LongWritable value : values){
                        count++;
                        freq += value.get( );
                        if(count ==1 && findAll){
                            Max = value.get( );
                            Min = value.get( );
                        }
                        if(findAll){
                            if(value.get( ) > Max)
                                Max = value.get( );
                            else if(value.get( ) < Min)
                                Min = value.get( );
                        }
                    }
                    if(findAll){
                        if(count != 0)
                            Avg = freq/count;
                    }
                    String outputValue = String.valueOf(freq)+"\t";
                    if(findAll){
                        outputValue += String.valueOf(Avg) + "\t";
                        outputValue += String.valueOf(Max) + "\t";
                        outputValue += String.valueOf(Min) + "\t";
                    }
                    context.write(new Text(data), new Text(outputValue));
            }
    }
}
```

As shown in Listing 3, numerical values for the same key are aggregated to generate a plurality of aggregate values, and categorical values for the same key are counted to generate frequency values.

In accordance with an embodiment, Listing 4 below illustrates mapping strings generation for identifying for output files.

Listing 4

```
// Just write the column names array
Path completeColumns = new Path(outputPath+"/completecolumns");
FSDataOutputStream os5 = fs.create(completeColumns);
os5.write(headerLine.getBytes( ));
os5.write("\n".getBytes( ));
os5.write(groupString.getBytes( ));
os5.write("\n".getBytes( ));
os5.write(objString.getBytes( ));
os5.write("\n".getBytes( ));
os5.write(inputPath.getBytes( ));
os5.close( );
// Now write detailed mappings
```

Listing 4

```
Path mapping = new Path(outputPath+"/completemapping");
FSDataOutputStream os6 = fs.create(mapping);
String mappingString = "";
for(String key : queryMap.keySet( )) {
// Total column information
    String[ ] fullCols = key.split(":");
    String colFullType = "";
    String colFullDescription = "";
    boolean metricAadded = false;
    for(String fullCol: fullCols) {
        String[ ] cold = fullCol.split("_");
        int coldid;
        String coldtype;
        if(cold != null && cold.length > 1) {
            int colindex = Integer.parseInt(cold[0]);
            String columnName = colSplits[colindex];
            if(cold[1].equals("S")){
                metricAadded = true;
                colFullDescription += "SUM_"+columnName+"\t";
                colFullDescription += "AVG_"+columnName+"\t";
                colFullDescription += "MAX_"+columnName+"\t";
                colFullDescription += "MIN_"+columnName+"\t";
                System.out.println(colFullDescription);
            }
            else {
                colFullDescription += columnName+"\t";
            }
        }
    }
    if(!metricAadded){
        colFullDescription += "FREQ";
    }
    mappingString +=colFullDescription+":"+queryMap.get(key)+"\n";
}
    os6.write(mappingString.getBytes( ));
```

In accordance with an embodiment, the code snippets above can process the sample source data as shown in Table 1, and generate a plurality of output files as shown in Listing 5 below.

TABLE 1

| GENDER | COLOR  | CITY        | SALES | PHONE  |
|--------|--------|-------------|-------|--------|
| Male   | Red    | New York    | 19034 | Nexus  |
| Female | Green  | Los Angeles | 48906 | Nexus  |
| Female | Yellow | Los Angeles | 76301 | iPhone |
| Female | Red    | New York    | 21029 | iPhone |
| Female | Gold   | SFO         | 33401 | Nexus  |
| Male   | Red    | New York    | 57102 | iPhone |
| female | Red    | New York    | 93901 | iPhone |
| Male   | Green  | Los Angeles | 80111 | Nexus  |
| Male   | Yellow | Louisville  | 40299 | iPhone |
| female | Gold   | SFO         | 6854  | iPhone |

TABLE 2

| Columns | Frequency/Aggregate Values | Output File Names |
|---------|----------------------------|-------------------|
| GENDER PHONE | FREQ | part-r-00008 |
| COLOR CITY PHONE | SUM_SALES AVG_SALES MAX_SALES MIN_SALES | part-r-00026 |
| GENDER COLOR CITY | FREQ | part-r-00003 |
| CITY | FREQ | part-r-00013 |
| GENDER | FREQ | part-r-00001 |
| COLOR | FREQ | part-r-00012 |

TABLE 2-continued

| Columns | Frequency/Aggregate Values | Output File Names |
|---------|----------------------------|-------------------|
| PHONE | | |
| PHONE | SUM_SALES AVG_SALES MAX_SALES MIN_SALES | part-r-00030 |
| GENDER COLOR CITY PHONE | FREQ | part-r-00004 |
| GENDER COLOR | SUM_SALES AVG_SALES MAX_SALES MIN_SALES | part-r-00017 |
| GENDER CITY | SUM_SALES AVG_SALES MAX_SALES MIN_SALES | part-r-00021 |
| GENDER CITY | FREQ | part-r-00007 |
| GENDER COLOR CITY PHONE | SUM_SALES AVG_SALES MAX_SALES MIN_SALES | part-r-00019 |
| CITY PHONE | FREQ | part-r-00014 |
| GENDER COLOR CITY | SUM_SALES AVG_SALES MAX_SALES MIN_SALES | part-r-00018 |
| GENDER COLOR | FREQ | part-r-00002 |
| GENDER CITY PHONE | SUM_SALES AVG_SALES MAX_SALES MIN_SALES | part-r-00022 |
| CITY | SUM_SALES AVG_SALES MAX_SALES MIN_SALES | part-r-00028 |
| GENDER PHONE | SUM_SALES AVG_SALES MAX_SALES MIN_SALES | part-r-00029 |
| COLOR CITY | SUM_SALES AVG_SALES MAX_SALES MIN_SALES | part-r-00025 |
| COLOR CITY PHONE | FREQ | part-r-00011 |
| COLOR PHONE | SUM_SALES AVG_SALES MAX_SALES MIN_SALES | part-r-00027 |
| COLOR | FREQ | part-r-00009 |
| GENDER COLOR PHONE | SUM_SALES AVG_SALES MAX_SALES MIN_SALES | part-r-00020 |
| GENDER | SUM_SALES AVG_SALES MAX_SALES MIN_SALES | part-r-00016 |
| COLOR | SUM_SALES AVG_SALES MAX_SALES MIN_SALES | part-r-00024 |
| GENDER PHONE | SUM_SALES AVG_SALES MAX_SALES MIN_SALES | part-r-00023 |
| GENDER COLOR PHONE | FREQ | part-r-00005 |
| PHONE | FREQ | part-r-00015 |
| GENDER CITY | FREQ | part-r-00006 |

TABLE 2-continued

| Columns | Frequency/Aggregate Values | Output File Names |
|---|---|---|
| COLOR CITY | FREQ | part-r-00010 |

As shown in Table 2, a total of 30 output files can be generated. The content of the output file "part-r-00021" is provided for illustration purpose in Listing 5.

| Listing 5 | | | | | |
|---|---|---|---|---|---|
| female | Los Angeles | 125207 | 62603 | 76301 | 48906 |
| female | New York | 114930 | 57465 | 93901 | 21029 |
| female | SFO | 40255 | 20127 | 33401 | 6854 |
| male | Los Angeles | 80111 | 80111 | 80111 | 80111 |
| male | Louisville | 40299 | 40299 | 40299 | 40299 |
| male | New York | 76136 | 38068 | 57102 | 19034 |

As shown in Listing 5 and Table 2, the associated mapping string can describe the content of the output file "part-r-0021". As such, the mapping string can be used to map a query to the corresponding output file.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for generating a multidimensional data cube from source data comprising a plurality of columns and a plurality of lines, the system comprising:
    a microprocessor;
    a data processing cluster executing on the microprocessor, wherein the data processing cluster includes a distributed file system; and
    a map reduce program configured to perform steps comprising,
        analyzing the plurality of columns in the source data to identify a plurality of numerical columns and a plurality of subsets of categorical columns;
        combining each of the identified plurality of numerical columns with each of the identified plurality of subsets of categorical columns to generate a plurality of column combinations from the plurality of columns in the source data,
        generating a plurality of data combinations for each of the plurality of lines in the source data using said plurality of column combinations,
        generating a plurality of key-value pairs corresponding to the plurality of data combinations,
        aggregating values paired with a same key to determine a plurality of aggregate values,
        counting categorical values for a same key to generate a plurality of frequency values;
        generating, a plurality of output files in the distributed file system, wherein each output file stores a pre-computed result of a query on the source data represented by one or more of said plurality of aggregate values or one or more of said plurality of frequency values such that pre-computed results for all possible queries on the source data are stored in said plurality of output files, and
        encapsulating the plurality of output files into a data cube cached in the distributed file system such that pre-computed results for all possible queries on the source data are encapsulated in the data cube; and
    wherein the data cube returns a pre-computed result from the data cube to a client application in response to a query received from the client application.

2. The system of claim 1, wherein the data processing cluster further includes a representational state transfer application programming interface (REST API), wherein the REST API is used by the client application to run the query over the data cube, and receive the pre-computed result from the data cube.

3. The system of claim 1, further comprising
    a file indexer that includes a plurality of mapping strings, wherein each mapping string is associated with one of the plurality of output files in the data cube; and
    wherein the file indexer maps the query to an output file that includes the pre-computed result for the query from the client application.

4. The system of claim 1, wherein the map-reduce program is further configured to clean the source data to remove one or more columns from the source data, wherein the removed columns are not used in generating the plurality of data combinations.

5. The system of claim 1, wherein aggregating values paired with a same key to determine a plurality of aggregate values uses the map-reduce program to aggregate values for a same key to generate a frequency value or one or more aggregate values.

6. The system of claim 1, wherein the plurality of aggregate values includes one or more of a maximum value, a minimum value, an average value, a sum, a median, or a mode.

7. The system of claim 1, wherein the pre-computed result of a query comprise an output table comprising data derived from said source data.

8. The system of claim 1, wherein the data processing cluster is a Hadoop cluster.

9. A method for generating a multidimensional data cube in a distributed file system from source data comprising a plurality of columns and a plurality of lines, the method comprising:
    configuring a data processing cluster executing on a microprocessor, wherein the data processing cluster includes a map-reduce program;
    analyzing the plurality of columns in the source data to identify a plurality of numerical columns and a plurality of subsets of categorical columns;
    combining each of the identified plurality of numerical columns with each of the identified plurality of subsets of categorical columns to generate a plurality of column combinations from the plurality of columns in the source data;
    generating a plurality of data combinations for each of the plurality of lines in the source data using said plurality of column combinations;
    generating a plurality of key-value pairs corresponding to the plurality of data combinations;
    aggregating values paired with a same key to determine a plurality of aggregate values;
    counting categorical values for a same key to generate a plurality of frequency values;
    generating, using the map-reduce program, a plurality of output files in the distributed file system, wherein each output file stores a pre-computed result of a query on the source data represented by one or more of said plurality of aggregate values or one or more of said plurality of frequency values such that pre-computed results for all possible queries on the source data are stored in said plurality of output files;
    encapsulating the plurality of output files into a data cube cached in the distributed file system such that pre-computed results for all possible queries on the source data are encapsulated in the data cube; and
    returning a pre-computed result from the data cube to a client application in response to a query received from the client application.

10. The method of claim 9, wherein the data processing cluster further includes a representational state transfer application programming interface (REST API), wherein the REST API is used by the client application to run the query over the data cube, and receive the pre-computed result from the data cube.

11. The method of claim 9, further comprising
    providing a file indexer that includes a plurality of mapping strings, wherein each mapping string is associated with one of the plurality of output files in the data cube, wherein the file indexer maps the query to an output file that includes the pre-computed result for the query from the client application.

12. The method of claim 9, wherein the map-reduce program cleans the source data to remove one or more columns from the source data, wherein the removed columns are not used in generating the plurality of data combinations.

13. The method of claim 9, wherein aggregating values paired with a same key to determine a plurality of aggregate values uses the map-reduce program to generate a frequency value or one or more aggregate values.

14. The method of claim 9, wherein the plurality of aggregate values includes one or more of a maximum value, a minimum value, an average value, a sum, a median, or a mode.

15. The method of claim 9, wherein each pre-computed result of a query comprises an output table comprising data derived from said source data.

16. The method of claim 9, wherein the data processing cluster is a Hadoop cluster.

17. A non-transitory computer readable storage medium, including instructions stored thereon for generating a multidimensional data cube in a distributed file system from source data comprising a plurality of columns and a plurality of lines, which instructions, when read and executed by one or more computers cause the one or more computers to perform the steps comprising:
- configuring a data processing cluster executing on a microprocessor, wherein the data processing cluster includes a map-reduce program;
- analyzing the plurality of columns in the source data to identify a plurality of numerical columns and a plurality of subsets of categorical columns;
- combining each of the identified plurality of numerical columns with each of the identified plurality of subsets of categorical columns to generate a plurality of column combinations from the plurality of columns in the source data;
- generating a plurality of data combinations for each of the plurality of lines in the source data using said plurality of column combinations;
- generating a plurality of key-value pairs corresponding to the plurality of data combinations;
- aggregating values paired with a same key to determine a plurality of aggregate values;
- counting categorical values for a same key to generate frequency values;
- generating, using the map-reduce program, a plurality of output files in the distributed file system, wherein each output file stores a pre-computed result of a query on the source data represented by one or more of said plurality of aggregate values or one or more of said plurality of frequency values such that pre-computed results for all possible queries on the source data are stored in said plurality of output files;
- encapsulating the plurality of output files into a data cube cached in the distributed file system such that pre-computed results for all possible queries on the source data are encapsulated in the data cube; and
- returning a pre-computed result from the data cube to a client application in response to a query received from the client application.

18. The non-transitory computer readable storage medium of claim 17, wherein the data processing cluster further includes a representational state transfer application programming interface (REST API), wherein the REST API is used by the client application to run the query over the data cube, and receive the pre-computed result from the data cube.

* * * * *